Feb. 1, 1944.   A. SIMMON   2,340,624
FILM WINDING DEVICE FOR CAMERAS
Filed May 27, 1943   2 Sheets-Sheet 1
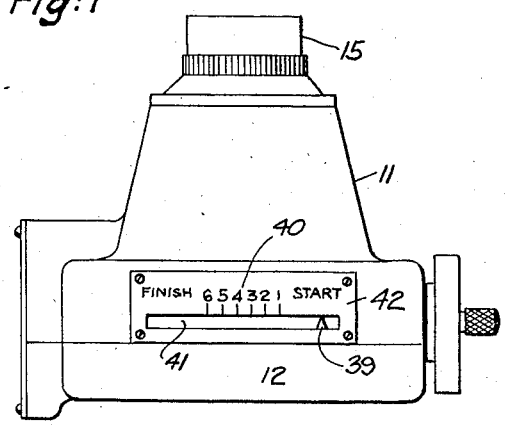
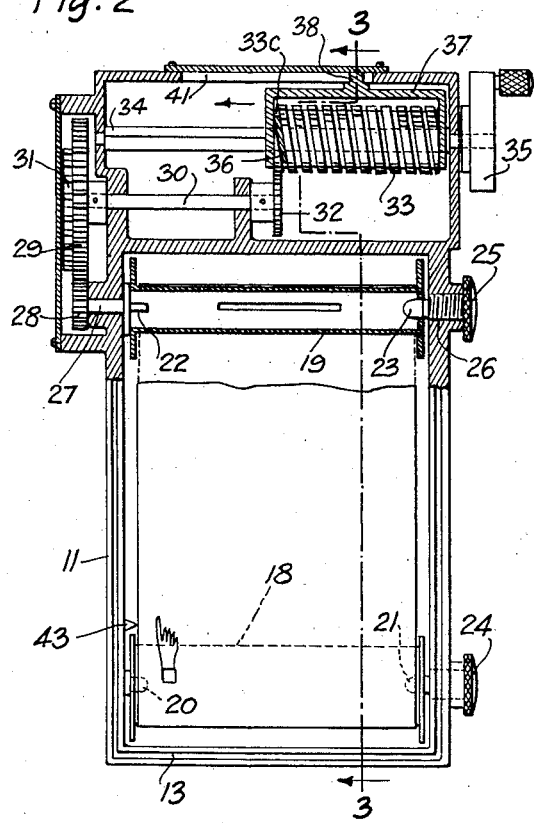
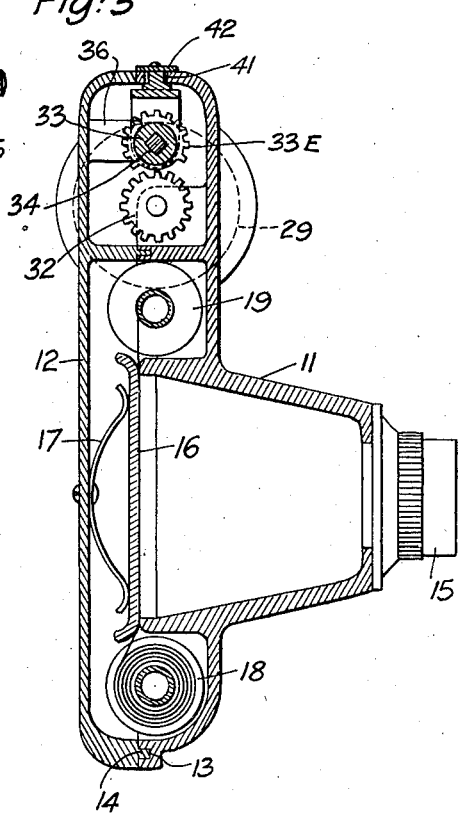
INVENTOR:
Alfred Simmon
BY Walter E. Wollheim
ATTORNEY Feb. 1, 1944.  A. SIMMON  2,340,624
FILM WINDING DEVICE FOR CAMERAS
Filed May 27, 1943  2 Sheets-Sheet 2
Fig: 4
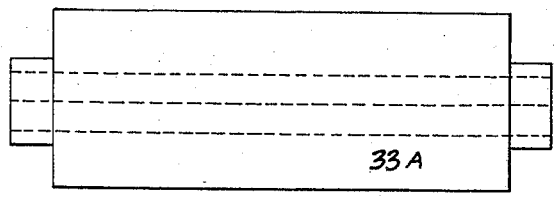
Fig: 4A
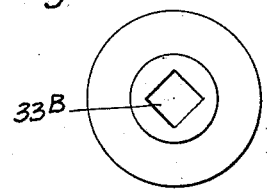
Fig: 5
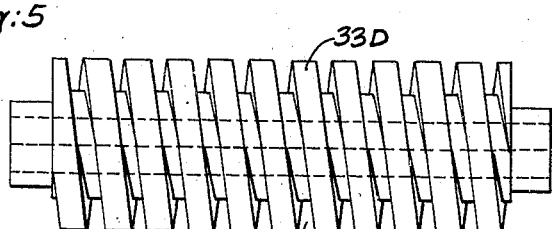
Fig: 5A
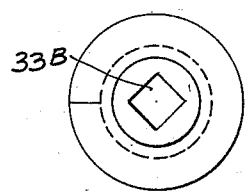
Fig: 6
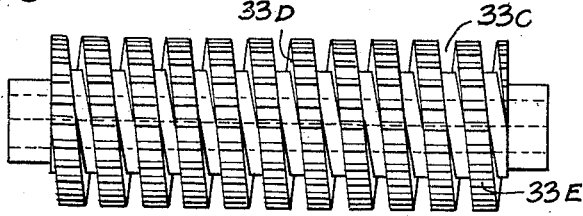
Fig: 6A
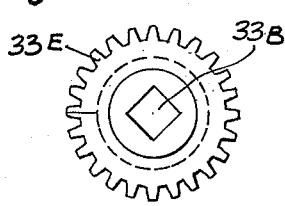
Fig: 7
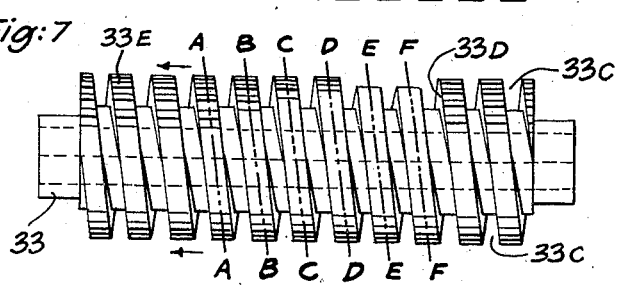
Fig: 7A
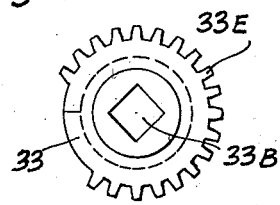
Fig: 8
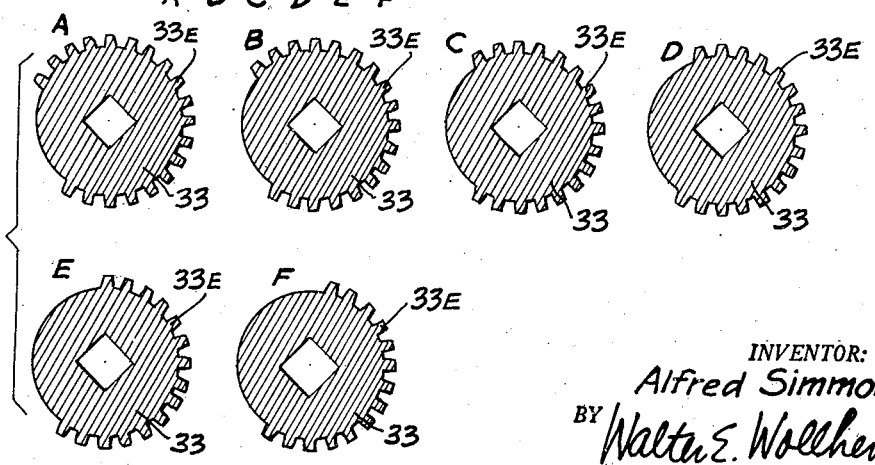
INVENTOR:
Alfred Simmon
BY Walter E. Wollheim
ATTORNEY Patented Feb. 1, 1944

2,340,624

UNITED STATES PATENT OFFICE 2,340,624

FILM WINDING DEVICE FOR CAMERAS

Alfred Simmon, Jackson Heights, N. Y.

Application May 27, 1943, Serial No. 488,627

14 Claims. (Cl. 242—71)

The subject of this invention is an automatic film winding device for roll film cameras using non-perforated paper backed roll film.

During operation, i. e., between successive exposures, the film is unwound from one film spool and wound onto another one, and since during this process the diameter of the first spool decreases and the diameter of the second spool increases, the film key which drives the second, i. e., the film receiving spool, must perform between successive exposures a steadily decreasing number of revolutions.

Originally camera backs were equipped with a window made of red Celluloid or the like through which numbers printed on the paper backing of the film could be read, and the operator merely turned the film winding knob until the next number appeared in the window. With the advent of more sensitive film, this method has become increasingly unsatisfactory since the film is too easily fogged. It is also too slow and requires too much attention from the operator. It has therefore become desirable to develop automatic film winding devices by means of which the operator can easily and conveniently advance the film one exposure frame between exposures. It is usually advantageous to combine these film advancing means with means to reset the camera shutter.

Heretofore two different methods have been proposed for this purpose. The first method uses a film measuring spool whereas the second method usually comprises a crank or the like with a variable stroke.

The film measuring spool is a simple spool or roller, driven by the film and of such a diameter that it performs a given number of revolutions, preferably one, for each exposure frame. After the film measuring spool has rotated this number of revolutions, a projection carried by or connected to it comes in contact with a stop which prevents the operator from advancing the film further. Since these film measuring spools in the case of non-perforated film have to rely on friction entirely, they are not fully positive in action and slip quite frequently. In order to improve upon this condition, the film measuring spools have been equipped with serrations or teeth, and means have been provded to exert pressure on the film. This has been successful only to a limited extent since not much pressure can be exerted in this manner without seriously damaging the film. It is difficult to connect the film measuring spool with means to reset the shutter because obviously the available force that can be transmitted through a film measuring spool is not very large since the roll film is not designed to act as a driving belt.

The second method that has been used comprises a crank or the like with a variable stroke, i. e., the stop itself which limits the stroke of the crank moves between successive operations, in the opposite direction, of course, usually by means of a ratchet drive, and renders the stroke of the crank progressively smaller. This system is more positive in action than the first one but it is complicated since it comprises numerous parts and it is still difficult to connect it with shutter resetting means. These means, whether they actuate a focal plane or a lens shutter always require a constant number of revolutions, usually one, and if it is desired to connect these shutter resetting means with film advancing means of varying stroke, equalizing devices such as differential gears or slip-clutches become necessary. These devices are complicated in character and not always reliable.

It is the purpose of this invention to provide simple and positive means to advance a non-perforated paper backed roll film automatically for the distance required for one exposure frame. The number of revolutions of the driving element or crank is constant, usually one, and the device lends itself therefore excellently to a combination with the shutter resetting drive. Another desirable feature of this device is the ease with which it can be adapted to count the exposures without the addition of complicated counters. The main drive shaft can also easily be connected with a cam to actuate a pressure plate to keep the film flat during the exposure.

A preferred embodiment in a camera of the film winding device forming the subject of this invention is shown in the accompanying drawings in which Fig. 1 is a plan view of the camera showing especially an exposure counter;

Fig. 2 is a rear view of the camera, partly in section, and with the back of the camera removed; and Fig. 3 is a longitudinal sectional view, partly in elevation, through the camera along the plane of line 3—3 in Fig. 2.

In the foregoing figures many parts which are essential for the operation of the camera but which do not form part of this invention, are not shown, and for example, the shutter, the range and view finder, the focusing means, and many other parts have been omitted; other parts are illustrated more or less diagrammatically;

Figs. 4 and 4A, 5 and 5A, 6 and 6A, 7 and 7A are elevational, respectively, side views of a peculiarly shaped gearlike element which forms the essential part of the invention; and Figs. 8A, B, C, D, E and F are cross sectional views along, respectively, the planes of lines A, B, C, D, E and F in Fig. 7.

Like characters of reference denote similar parts throughout the several views and the following specification.

Referring to Fig. 3, the camera consists of a main body 11 and a camera back 12. The camera back is fastened to the main camera body by means of any suitable latching device or lock such as found on cameras. A groove 13 runs around the rim of the camera into which a corresponding shaped tongue 14 fits which is part of the camera back, thus providing a light-tight connection between the two parts. The main body of the camera carries a lens 15 and the camera back carriers a pressure plate 16. It is the purpose of this pressure plate to keep the film in the focal plane of the camera, and the pressure plate may be either supported by a spring 17 as shown, or, if so desired, it may be operated by a cam in a manner well known in the art, i. e., the pressure plate will press the film into the focal plane during the actual exposure, but will be retracted by a suitable cam during the film advancing period.

The main camera body is provided with film spools 18 and 19. Film spool 18 is supported by a fixed pivot 20 and by a retractable pivot 21. Similarly film spool 19 is supported by a rotatable film key 22 and a retractable pivot 23. Pivots 21 and 23 are equipped with threads 26 and small knurled knobs 24 and 25. By turning knobs 24 and 25, pivots 23 and 21 may be retracted so that the insertion or removal of the film spools becomes possible. Film key 22 is connected to a short shaft 27 which carries a small gear 28. This gear meshes with a larger gear 29 which is mounted on shaft 30. Shaft 30 carries also a ratchet wheel 31 which prevents the rotation of film spool 19 in the wrong direction, and a gear 32. Gear 32 is driven by a peculiarly shaped gearlike machine element 33 which is shown in Figs. 4, 5, 6, 7 and 8, and which will be described in detail hereafter. This element 33 is driven by a shaft 34 which may be of square cross-section as shown or which may be a splined shaft of any suitable cross-section. Shaft 34 can be rotated by a crank or hand wheel 35.

The shape of element 33 upon which the whole invention is based can be best understood by following its process of manufacture, the various steps of which are shown in Figs. 4, 5, 6, 7, and 8. Figs. 4 and 4A show a turning 33A with a square hole 33B. This part is suitably made from steel so that it can be hardened. The square hole fits over shaft 34. In case of a splined shaft, instead of a square one, the hole, of course, must have a corresponding configuration. On this turning 33A we cut a simple helical groove 33C forming a number of convolutions 33D as shown in Fig. 5. The next step is shown in Fig. 6. The part illustrated in Fig. 5 is mounted on a gear cutting milling machine and teeth 33E of standard shape such as used on ordinary spur gears are cut. The resulting member is shown in Figs. 6 and 6A and looks somewhat like a gear hobbing tool except, of course, that the form and shape of the teeth are exactly the same as that of ordinary spur gear teeth. Eventually certain teeth are removed from this part as shown in Figs. 7 and 7A and also in Fig. 8 which shows six different cross sections A, B, C, D, E and F.

Element 33 is mounted on shaft 34 in such a way that it will rotate upon rotation of crank 35 but will be at perfect liberty to slide laterally in the direction of the arrow in Fig. 2. A narrow piece of steel 36 is mounted under a slight angle on camera back 12 in such a way that it will engage the helical groove of part 33 as soon as camera back 12 is attached to the main camera body 11. A cross section of part 36 is shown in Fig. 2 engaging the helical groove 33C of part 33 at the extreme left. In other words, part 36 is essentially a fragmentary nut and, since this nut is stationary, part 33 will upon rotation of crank 35 not only rotate but also slide laterally in the direction of the arrow.

Part 33 is held loosely by bracket 37 to which a projection 38 is attached. This projection 38 carries a mark 39 which cooperates with a scale 40 forming in effect a very simple exposure counter. Mark 39 is visible through a slot 41 in main body 11 which is preferably covered by a transparent plate 42.

The operation of the device is very simple. The operator removes the camera back 12 and loads the camera by first retracting pivot 21, turning knob 24, then inserting film spool 18 with the unexposed film and advancing pivot 21 again by turning knob 24 in the opposite direction. The leading end of the paper cover is then threaded into film spool 19 which is inserted into the camera in the same manner. The operator then turns gear 29 by hand. With the camera back removed, the edge of gear 29 is accessible until a suitable mark on the film covering paper is in approximate register with a corresponding mark 43 on the camera body. Commercially available films usually have the sign of a warning hand printed on the paper at some suitable distance from the actual beginning of the film and this warning hand can be most conveniently used for this purpose, and the proper relative position of this warning and the mark 43 on the camera body can be seen in Fig. 2. At this time gear member 33 should be in the extreme right position as shown in Fig. 2. This can either be done manually by the operator, or a spring can be provided which automatically pushes gear 33 into the extreme right position, i. e., in a direction opposite to that of the arrow. This spring is not shown in the drawing and may have any convenient shape as long as it exerts sufficient pressure to push element 33 to the right.

The operator now attaches camera back 12 to camera body 11. Since part 36 is fixedly attached to the camera back, it will now automatically engage the helical groove of part 33, and any subsequent rotation of crank 35 will force gear 33 not only to rotate but also, together with bracket 37 and mark 39, to slide laterally. Mark 39 will therefore, in a very simple manner, indicate the number of exposed frames on scale 40. The operator now observes this exposure counter and turns crank 35 until mark 39 is opposite scale division number 1 which indicates that the camera is now ready for the first exposure. After the first exposure the operator merely turns crank 35 one revolution each time which automatically advances the film a sufficient distance so that the desired number of exposure frames, substantially evenly spaced, are obtained on the film. After the last exposure, number 6 on the scale shown in Fig. 1, the operator rotates crank 5 several times until the entire film is wound onto the spool 19 whereupon the camera back is taken off and the exposed film removed in the usual manner. Since camera back 12 is removed, part 36 is no longer engaged by part 33 and if part 33 or its associated bracket 37 is biased by a suitable spring, it will automatically return into the starting position, i. e., the exposure counter will be self-resetting and the operator need pay no attention to it.

The property of this drive to advance the film a substantially uniform distance for each exposure is based upon two facts: first, that certain gear teeth have been removed in a manner shown in Figs. 7 and 8; and second, that gear 33, due to the engagement of its helical groove by part 36, performs not only a rotary but also a lateral motion so that each rotation of crank 35 brings a new convolution 33D into mesh with gear 32.

As shown in Figs. 7 and 8A five teeth have been removed from each convolution 33D for the first four convolutions and one additional tooth has then been removed from every subsequent convolution until ten are eventually removed from the ninth convolution, see Fig. 8F. The last two convolutions are identical with the starting convolution; i. e., five teeth have been removed from each. The figures are, of course, merely examples and may vary widely depending upon the type of film which is being used, but the general principle is always the same, i. e., as we advance, more and more teeth are removed from subsequent convolutions. It will be clear that in this manner an increasing amount of lost motion is introduced between gear element 33 and gear 32 and, while crank 35 performs one complete revolution for each exposure, gear 32 will perform less than one revolution. How much less depends upon the number of teeth which have been removed from the convolution of element 33 which at any particular time happens to be driving the gear 32. For the first three convolutions no film is advanced into the exposure position, but the paper leader is merely wound onto film spool 19. The next revolution of gear member 33 brings the starting end of the film into the exposure window of the camera. The respective diameters of gears 33, 32, and 29 have been computed in such a way that now one revolution of crank 35 will advance the film just enough for one exposure. At this time the diameter of spool 19 is relatively small since only the paper leader has been wound on it.

For the second exposure, crank 35 again performs one complete revolution and so does gear element 33, but since there is one more tooth missing from the fifth convolution of gear element 33, gear 32 now rotates a little less than formerly. At this time, however, the diameter of spool 19 is a little larger, so that already a little less rotary motion of gear 32 is required to advance the film one exposure frame.

For the third exposure we have the same condition, namely, one more tooth is removed from 33 thus reducing the angle of rotation of gear 32 still further, but the diameter of spool 19 is now still larger so that again the film is advanced only by the distance necessary for one exposure. It will be clear that in this manner further revolutions of crank 35 will cause less and less rotary motion to gear member 32 and that in this manner the effect of the increasing diameter of spool 19 can be compensated for so that the film is always advanced for substantially the same distance.

During this process gear member 33 will slide laterally in the direction indicated by the arrow in Fig. 2, carrying with it bracket 37 and mark 39. This enables the operator to read on scale 40 the number of the exposure for which the camera is set at any particular instance.

It may sometimes be advantageous to modify the design of gear member 33, slightly. Under certain conditions it will be found that in order to obtain the right proportions it will be necessary to provide gear 33 with a very large number of teeth which means that either its diameter will be large or that a very fine pitch must be chosen which is undesirable since the gear teeth are then too easily damaged. In this instance a perfectly practical approximation can be obtained by decreasing the number of teeth by one not for each convolution, as shown, but for every second one. This makes it possible to use relatively strong teeth of a coarse pitch with the result merely that the margin after each odd exposure may be a little larger than the margin after each even exposure. In very extreme cases it may even be desirable to decrease the number of teeth by one after every third convolution.

While no shutter has been shown, it will be clear that it will be quite simple to provide shutter resetting means in connection with this film winding device. For example, practically every focal plane shutter has already a shaft which performs one revolution for each exposure. It will therefore be merely necessary to have a 1:1 gear connection between this shaft of the shutter and shaft 34 which also performs one revolution per exposure. No shutter resetting device of this type has been shown in detail since devices of this type are well-known in the art.

While I have illustrated a simple spring actuated pressure plate in Fig. 3 it will be obvious that, if so desired, this pressure plate can be actuated in a very convenient manner by a suitably shaped cam. Such a cam can be mounted on shaft 34 and it is most advantageous in this connection that, due to the fact that a number of teeth have been removed, shaft 34 must rotate for a certain angle before it begins to drive gear 32 and the film. This angle, as shown in Fig. 7 or 8, is approximately 60° which gives the cam ample opportunity to lift the pressure plate before the film is set in motion so that any accidental damage thereto can be avoided with certainty.

It is obvious that various other changes of form, proportion, minor details and combination of parts may be resorted to without departing from or sacrificing any of the advantages of this invention as defined in the appended claims.

What I claim as new, is,

1. In a film winder for cameras, an actuating element consisting of a rotatable cylindrical member having a plurality of helical convolutions, a plurality of uniform teeth in said convolutions, said teeth decreasing in number in adjacent convolutions.

2. In a film winder for cameras, an actuating element consisting of a rotatable cylindrical member having a plurality of helical convolutions, a plurality of uniform teeth in said convolutions, said teeth decreasing in number in adjacent convolutions, convolutions at both ends of said member having the greatest number of teeth.

3. In a camera, a film winding spool, a rotatable member having a plurality of helically disposed convolutions, a plurality of uniform teeth in said convolutions, said teeth decreasing in number in adjacent convolutions, and gear mechanism engaging said teeth and operatively connecting said member with said spool, a complete revolution of said member causing film on said spool to advance one frame, said decreasing number of teeth in mesh with said gear mechanism compensating for the increasing diameter of film on said spool.

4. In a camera, a film winding spool, a rotatable and laterally slidable member having a plurality of helically disposed convolutions, a plurality of uniform teeth in said convolutions, said teeth decreasing in number in adjacent convolutions, gear mechanism engaging said teeth and operatively connecting said member with said spool, a complete revolution of said member causing film on said spool to advance one frame, said decreasing number of teeth in mesh with said gear mechanism compensating for the increasing diameter of film on said spool, and means to indicate the lateral position of said member exteriorly of the camera.

5. In a camera, a film winding spool, a slidable support, a rotatable member mounted within said support having a plurality of helically disposed convolutions, a plurality of uniform teeth in said convolutions, said teeth decreasing in number in adjacent convolutions, and gear mechanism engaging said teeth and operatively connecting said member with said spool, a complete revolution of said member causing film on said spool to advance one frame, said decreasing number of teeth in mesh with said gear mechanism compensating for the increasing diameter of film on said spool, the number of frames advanced being indicated by the position of said support.

6. In a camera, a film winding spool, a rotatable and laterally slidable member having a plurality of helically disposed convolutions, a plurality of uniform teeth in said convolutions, said teeth decreasing in number in adjacent convolutions, gear mechanism engaging said teeth and operatively connecting said member with said spool, a complete revolution of said member causing film on said spool to advance one frame, and a stationary element in the camera engaging said member between said convolutions adapted to force said member to move laterally while rotating to bring decreased number of teeth in mesh with said gear mechanism to compensate for the increasing diameter of film on said spool.

7. In a camera, a film winding spool, a slidable support, a rotatable member mounted within said support having a plurality of helically disposed convolutions, a plurality of uniform teeth in said convolutions, said teeth decreasing in number in adjacent convolutions, gear mechanism engaging said teeth and operatively connecting said member with said spool, a complete revolution of said member causing film on said spool to advance one frame, and a stationary element in the camera engaging said member between said convolutions adapted to force said member and support to move laterally while rotating to bring decreased number of teeth in mesh with said gear mechanism to compensate for the increasing diameter of film on said spool.

8. In a camera, a film winding spool, a rotatable and laterally slidable member having a plurality of helically disposed convolutions, a plurality of uniform teeth in said convolutions, said teeth decreasing in number in adjacent convolutions, gear mechanism engaging said teeth and operatively connecting said member with said spool, a complete revolution of said member causing film on said spool to advance one frame, a stationary element in the camera engaging said member between said convolutions adapted to force said member to move laterally while rotating to bring decreased number of teeth in mesh with said gear mechanism to compensate for the increasing diameter of film on said spool, and means to observe the lateral position of said member exteriorly of the camera indicative of the number of frames advanced.

9. In a camera, a film winding spool, a slidable support, a rotatable member mounted within said support having a plurality of helically disposed convolutions, a plurality of uniform teeth in said convolutions, said teeth decreasing in number in adjacent convolutions, gear mechanism engaging said teeth and operatively connecting said member with said spool, a complete revolution of said member causing film on said spool to advance one frame, and a stationary element in the camera engaging said member between said convolutions adapted to force said member and support to move laterally while rotating to bring decreased number of teeth in mesh with said gear mechanism to compensate for the increasing diameter of film on said spool, the lateral position of said support being indicative of the number of frames advanced.

10. In a camera, the combination of a front casing and a removable back, a film winding spool within said casing, a rotatable and laterally slidable member within said casing having a plurality of helically disposed convolutions, a plurality of uniform teeth in said convolutions, said teeth decreasing in number in adjacent convolutions, gear mechanism engaging said teeth and operatively connecting said member with said spool, a complete revolution of said member causing film on said spool to advance one frame, and a stationary element in said back engaging said member between said convolutions adapted to force said member to move laterally while rotating to bring decreased number of teeth in mesh with said gear mechanism to compensate for the increasing diameter of film on said spool.

11. In a camera, the combination of a front casing and a removable back, a film winding spool within said casing, a slidable support within said casing, a rotatable member mounted within said support having a plurality of helically disposed convolutions, a plurality of uniform teeth in said convolutions, said teeth decreasing in number in adjacent convolutions, gear mechanism engaging said teeth and operatively connecting said member with said spool, a complete revolution of said member causing film on said spool to advance one frame, and a stationary element in said back engaging said member between said convolutions adapted to force said member and support to move laterally while rotating to bring decreased number of teeth in mesh with said gear mechanism to compensate for the increasing diameter of film on said spool.

12. In a camera, the combination of a front casing and a removable back, a film winding spool within said casing, a rotatable and laterally slidable member within said casing having a plurality of helically disposed convolutions, a plurality of uniform teeth in said convolutions, said teeth decreasing in number in adjacent convolutions, gear mechanism engaging said teeth and operatively connecting said member with said spool, a complete revolution of said member causing film on said spool to advance one frame, a stationary element in said back engaging said member between said convolutions adapted to force said member to move laterally while rotating to bring decreased number of teeth in mesh with said gear mechanism, said casing having a slot and adjacent markings, and a marker in combination with said member travelling within said slot for the purpose of indicating the number of frames advanced by the lateral position of said member.

13. In a camera, the combination of a front casing and a removable back, a film winding spool within said casing, a slidable support within said casing, a rotatable member mounted within said support having a plurality of helically disposed convolutions, a plurality of uniform teeth in said convolutions, asid teeth decreasing in number in adjacent convolutions, gear mechanism engaging said teeth and operatively connecting said member with said spool, a complete revolution of said member causing film on said spool to advance one frame, and a stationary element in said back engaging said member between said convolutions adapted to force said member and support to move laterally while rotating to bring decreased number of teeth in mesh with said gear mechanism, said casing having a slot and adjacent markings, and said support having a marker travelling within said slot for the purpose of indicating the number of frames advanced by the lateral position of said support.

14. In a camera, the combination of a front casing and a removable back, a film winding spool within said casing, a slidable support within said casing, a rotatable member mounted within said support having a plurality of helically disposed convolutions, a plurality of uniform teeth in said convolutions, said teeth decreasing in number in adjacent convolutions, convolutions at both ends of said member having the greatest number of teeth, gear mechanism engaging said teeth and operatively connecting said member with said spool, a complete revolution of said member causing film on said spool to advance one frame, and a stationary element in said back engaging said member between said convolutions adapted to force said member and support to move laterally while rotating to bring decreased number of teeth in mesh with said gear mechanism to compensate for the increasing diameter of film on said spool, the greater number of teeth in said end convolutions adapted to wind film rapidly upon said spool, said casing having a slot and adjacent markings, and a marker forming part of said support travelling within said slot for the purpose of indicating the number of frames advanced by the lateral position of said support.

ALFRED SIMMON.